F. J. WILDEMANN.
CIGAR LIGHTER.
APPLICATION FILED FEB. 10, 1909.

934,119.

Patented Sept. 14, 1909.

WITNESSES:
M. A. Johnson
E. A. Pell

INVENTOR
Francis J. Wildemann
BY
Wm. H. Campfield
ATTORNEYS

UNITED STATES PATENT OFFICE.

FRANCIS J. WILDEMANN, OF NEWARK, NEW JERSEY.

CIGAR-LIGHTER.

934,119.  Specification of Letters Patent.  Patented Sept. 14, 1909.

Application filed February 10, 1909. Serial No. 477,125.

*To all whom it may concern:*

Be it known that I, FRANCIS J. WILDEMANN, a citizen of the United States, residing at Newark, in the county of Essex and State of New Jersey, have invented certain new and useful Improvements in Cigar-Lighters; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a cigar-lighter which comprises a receptacle for an illuminating fluid having a wick thereon, which wick is adapted to be ignited by an electric spark caused by the passage of a finger over the end of the burner, and the device comprises an arm carrying this finger, which arm is adapted to be operated by a handle and returned to its normal position by a spring, the arm also having a plate which is adapted to extinguish the light when the handle is released.

The device further embodies a receptacle which is adjustably secured in the casing so that it can be raised up as the burner is worn off by its contact with the igniting finger.

The device is illustrated in the accompanying drawing, in which—

Figure 1:
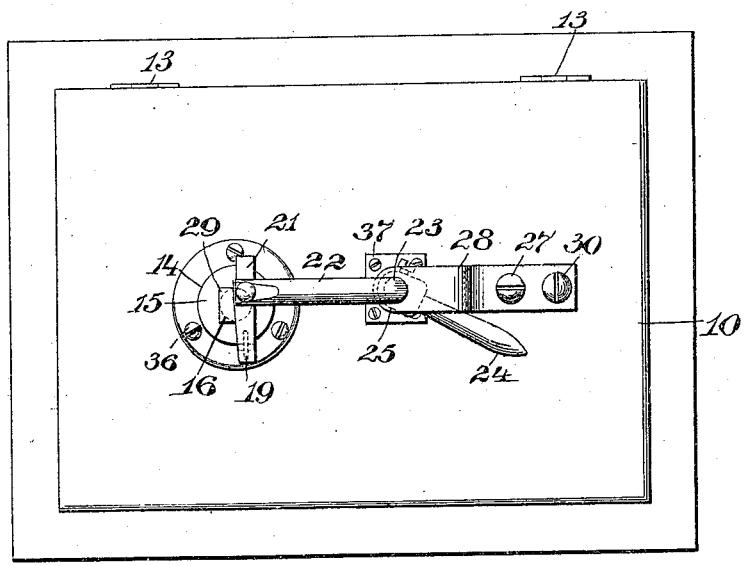
Figures 2, 3, 4:
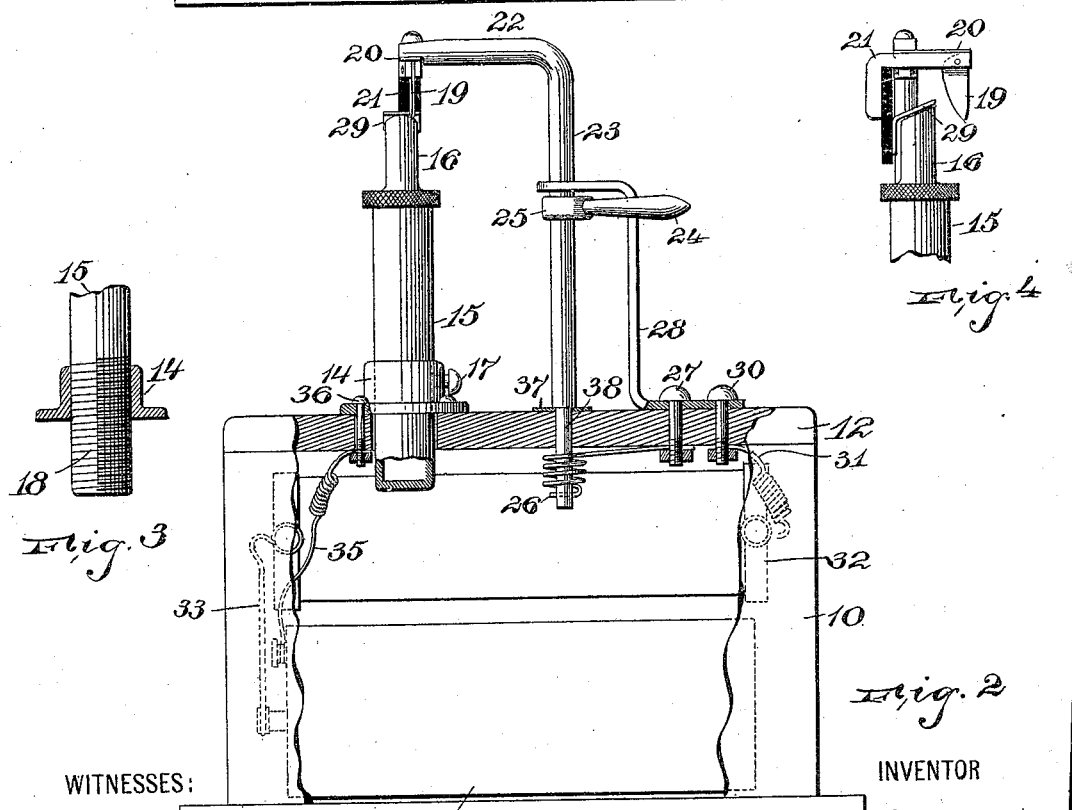

Figure 1 is a top view of the device, and Fig. 2 is a side view with the casing shown broken away. Fig. 3 is a section of a modified form of receptacle, and Fig. 4 is a face view of the igniting device.

The device consists of a base 10 which is in the form of a box and forms a receptacle and is provided with a top 12 which is preferably attached to the base 10 by the hinges 13, and it can have any suitable lock for fastening it. On the lid or top 12 is placed a collar 14 which is adapted to receive a cylindrical or tubular receptacle 15 which is adapted to contain the illuminant, such as alcohol or kerosene, and is provided with a burner 16 through which a wick is adapted to pass. The receptacle 15 is adjustably arranged in the collar 14, being either adapted to slide in there and be secured by a set-screw 17, as in Fig. 2, or the receptacle 15 can be screw-threaded as at 18 and adapted to fit the screw-threaded interior of the collar 14 so that the receptacle can be adjusted vertically for the purposes to be hereinafter described. The wick in the lamp is adapted to be ignited by a finger 19 which is normally held down by a spring 20, and which is secured on the cross-piece 21 on the right-angled portion 22 of a rotating rod 23, the rod being adapted to be operated in one direction by the handle 24 which is attached thereto by means of the collar 25, and rotated in the other direction by a spring 26 which is secured to one of the screws 27 which holds down the bearing-plate 28, which bearing-plate is formed of a Z-shaped strip of sheet metal.

When the handle is released it is stopped by engaging the bearing-plate 28 as shown in Figs. 1 and 2, and when in this position, a shield 29 engages the wick to smother the flame so that it is automatically extinguished when the handle 24 is released. A screw 30, which is also used in securing the bearing-plate 28, forms an electric contact therewith for the wire 31 which is connected to the spark-coil 32, the spark-coil being connected by means of the wire 33 with the electric battery, preferably a dry battery 34, and the battery is connected, by means of a wire 35, with one of the screws 36 which acts as a binding post for the wire and also assists in securing the sleeve 14 to the top or lid of the device. The rod 23 rests on a plate 37 and has the reduced portion 38 so that a shoulder is formed to rest on the plate 37 to take up the wear. When the lighter has been used continuously for some time, the friction of the finger 19 on the top end of the burner 16 causes the burner to be worn away, and the adjustable feature of the receptacle or lamp then permits the lamp to be raised so that long life is possible for the lamp and the burner, since the burner can be worn down to a low point, due to the ability of the receptacle to be raised.

Having thus described my invention, what I claim is:—

1. A cigar-lighter comprising a base forming a receptacle having a lid, a lamp mounted on the lid and adapted to form an electric conductor, an arm, means for swinging the arm, a contact to engage the lamp when the rod is swung, and means for adjusting the lamp vertically.

2. A cigar-lighter comprising a base forming a receptacle having a lid thereon, means for generating electricity within the receptacle, a lamp mounted on the lid and electrically connected with an electric circuit, a swinging arm having means on its end for engaging the lamp to form a spark, means for connecting the arm with the electric circuit, means for operating the arm, and means for vertically adjusting the lamp.

3. A cigar-lighter comprising a base forming a receptacle, a right-angled arm vertically mounted on the base, a bearing for the arm, a sparking device on the end of the arm, a handle on the arm for operating it, a spring to return the arm to its normal position, a lamp having a burner on the end thereof to coöperate with the sparking device, and means for vertically adjusting the lamp.

4. A cigar-lighter comprising a base forming a receptacle, a right-angled arm vertically mounted on the base, a bearing for the arm, a sparking device on the end of the arm, a handle on the arm for operating it, a spring to return the arm to its normal position, a socket on the receptacle having a screw-threaded interior, and a lamp having a burner to coöperate with the sparking device, the lamp being threaded and adapted to be adjusted in the socket.

In testimony, that I claim the foregoing, I have hereunto set my hand this 8th day of February 1909.

FRANCIS J. WILDEMANN.

Witnesses:
 WM. H. CAMFIELD,
 E. A. PELL.